(12) United States Patent
Kim

(10) Patent No.: US 7,917,603 B2
(45) Date of Patent: Mar. 29, 2011

(54) METHOD FOR SETTING AN INTERNET PROTOCOL ADDRESS USING A VEHICLE IDENTIFICATION NUMBER

(75) Inventor: Byeong-Woo Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 322 days.

(21) Appl. No.: 10/998,512

(22) Filed: Nov. 29, 2004

(65) Prior Publication Data

US 2005/0273505 A1 Dec. 8, 2005

(30) Foreign Application Priority Data

Jun. 7, 2004 (KR) ........................ 10-2004-0041488

(51) Int. Cl.
*G06F 15/177* (2006.01)
(52) U.S. Cl. ..................................................... 709/220
(58) Field of Classification Search ................... 709/220
See application file for complete search history.

(56) References Cited

U.S. PATENT DOCUMENTS

| | | | | |
|---|---|---|---|---|
| 2003/0103482 | A1* | 6/2003 | Van Bosch | 370/338 |
| 2004/0037316 | A1* | 2/2004 | Choi et al. | 370/466 |
| 2005/0060364 | A1* | 3/2005 | Kushwaha et al. | 709/200 |
| 2006/0178793 | A1* | 8/2006 | Hecklinger | 701/35 |
| 2006/0212772 | A1* | 9/2006 | Luo | 714/752 |
| 2006/0217849 | A1* | 9/2006 | Obradovich et al. | 701/1 |

FOREIGN PATENT DOCUMENTS

KR 1020030056864 A 7/2003

OTHER PUBLICATIONS

Francis Dupont, Loutfi Nuaymi, IMEI-based universal IPv6 interface IDs, Dec. 2003, Internet Engineering Task Force, Internet Draft.*
AnalogX VIN View, Page was last modified on Dec. 16, 2001. Retrieved on Oct. 31, 2006 from AnalogX website.*
MAC Address, Wikipedia Encyclopedia, Page was last modified on Oct. 23, 2006.*
IPv4, Wikipedia Encyclopedia, Page was last modified on Oct. 19, 2006.*
Vehicle Identification Number, Wikipedia Encyclopedia, Page was last modified on Oct. 27, 2006.*

(Continued)

*Primary Examiner* — Kevin Bates
*Assistant Examiner* — Oleg Survillo
(74) *Attorney, Agent, or Firm* — The Farrell Law Firm, P.C.

(57) ABSTRACT

A method for setting an IP (Internet Protocol) address for accessing a specified network is disclosed. The method includes detecting values that indicate inherent information of a vehicle from a vehicle identification number that includes specified vehicle information, setting a specified bit value for reporting that the IP address is a unique address, and creating the IP address by combining the specified bit value with the values that indicate the inherent information of the vehicle. According to the present method, the inherent IP address can be set for each vehicle by setting an interface identifier (ID) of the IP address using the vehicle identification number. Also, diverse vehicle information can be obtained through the interface ID of the IP address set using the vehicle identification number. Because, the IP address is set by the invention composed of the interface ID of 64 bits, it is compatible with the existing Extended Unique Identifier EUI-64 format.

2 Claims, 5 Drawing Sheets

OTHER PUBLICATIONS

R. Hinden, S. Deering, IP Version 6 Addressing Architecture, Apr. 2003, Network Working Group, Request for Comments: 3513, Chapter 2.5.1 Interface Identifiers.*

N. Freed, N. Borenstein, Multipurpose Internet Mail Extensions (MIME) Part One: Format of Internet Message Bodies, Nov. 1996, Network Working Group, Request for Comments: 2045, pp. 5, 23-24.*

Microsoft Corporation, IPv6 Interface Identifiers, Microsoft Corp., pp. 1-4. Accessed on Apr. 20, 2007.*

* cited by examiner

| 02 | 24 | 30 | FF | FE | 00 | 24 | 30 |

FIG. 1C
(PRIOR ART)

| NETWORK PREFIX | 02 | 24 | 30 | FF | FE | 00 | 24 | 30 |

FIG. 1D
(PRIOR ART)

| 2A | 30 | 71 | 0C | 5C | 00 | 52 | 34 |

FIG.4C

| NETWORK PREFIX | 2A | 30 | 71 | 0C | 5C | 00 | 52 | 34 |

FIG.4D

METHOD FOR SETTING AN INTERNET PROTOCOL ADDRESS USING A VEHICLE IDENTIFICATION NUMBER

PRIORITY

This application claims priority to an application entitled "Method for Setting Internet Protocol Address Using Vehicle Identification Number" filed in the Korean Industrial Property Office on Jun. 7, 2004 and assigned Serial No. 2004-41488, the contents of which are hereby incorporated by reference.

BACKGROUND OF THE INVENTION

1. Field of the Invention

The present invention relates generally to a method for setting an IP (Internet Protocol) address, and more particularly to a method for setting an inherent IPv6 (Internet Protocol version 6) address of a vehicle using a vehicle identification number including specified vehicle information

2. Description of the Related Art

The present Internet Protocol version 4 (IPv4) has not been changed since the request for comment (RFC) 791 announcement in 1981. It has been proven that IPv4 can be easily implemented and can perform mutual operations. It was seen that networks can be extended through IPv4 so that the Internet of the present extensive scale can be used globally.

IPv4 is an IP (Internet Protocol) that is currently used, and can be expressed as a decimal number composed of four 8 bits. An IPv4 address is represented by four octets separated by periods ("."), where the respective separated numbers are in the range of 0 to 225. This whole address is globally unique.

An IPv4 address includes a structure having a virtual net ID (i.e., a name assigned to a network to which a corresponding computer belongs and a host ID (i.e., a name assigned to a single corresponding computer). IP addresses are divided into five (i.e., A to E) grades, and each grade represents a network that can be expressed by the IP address having a form of the corresponding grade and the number of hosts. At present, A, B and C grades are generally used in the Internet.

However, with the rapid growth of the Internet, the drain of address space is at hand, and a need for security in an Internet Protocol standard is becoming more necessary. Also, better resources are required to provide a Quality of Service (QoS) for real-time data transfer.

In order to resolve above described drawbacks and needs, the IETF (Internet Engineering Task Force) has developed protocols and standards named IPv6. IPv6 is composed of an address system of 128 bits, and has a structure in which network prefixes and interface IDs (Interface Identifiers) are combined. IPv6 is the next-generation Internet Protocol that accommodates four times more information, i.e. IP addresses, than IPv4, the existing 32-bit system. IPv6 can easily overcome any technical and physical limitations of IPv4 in the IP address accommodation, multimedia real-time process and security capability.

Currently, in order to access the Internet from vehicles, there is an increasing trend to mount a communication module inside the vehicles. This will tremendously increase the need for additional IP addresses, it is therefore necessary to use IPv6, which is capable of accommodating a large amount of information. In order to avoid collision, a respective IPv6 address, owned by a communication module that accesses the network, should have an inherent value in the network and thus diverse methods for setting inherent IPv6 addresses have been proposed.

When an IPv6 address is set, an Extended Unique Identifier EUI-64 type interface ID is generally set using an Ethernet MAC (Media Access Control). A method for setting the IPv6 address will be explained with reference to FIGS. 1A to 1D.

FIGS. 1A to 1D will now be used to explain a process of setting an IPv6 address. Referring to FIGS. 1A to 1D, lower 64 bits of a 128-bit IPv6 address are constructed using its own 48-bit MAC address. More specifically, the 48-bit MAC address "00:24:30:33:FC:A2", as illustrated in the top line numbers of FIG. 1A, is briefly divided into halves. The first half of 24 bits (i.e., "00:24:30") of the 48-bit MAC address indicates a "company ID", and the remaining half of 24 bits (i.e., "33:FC:A2") is used for extension of a respective company. Specifically, the MAC address is used for the purpose of indicating the serial numbers of products prepared by companies, and classifies the products themselves. This MAC address is converted into an EUI-64-bit address by adding a dummy "0xFFFE" address of 16 bits in the middle of the MAC address.

As shown in FIG. 1B, the seventh bit b1 from the most significant bit of the most significant byte "00" in FIG. 1A, to which "FF:FE" of 16 bits is added, is set to "1". Accordingly, the lower 64-bit interface ID "02:24:30:FF:FE:00:24:30" of the IPv6 address results, as shown in FIG. 1B. Here, the seventh bit b1 of the most significant byte is a U/L (Universal/Local) bit used for reporting that the IPv6 address is globally unique. By combining a network prefix with the interface ID (See FIG. 1C) created through the above-described process, a global IPv6 address of FIG. 1D is set.

In addition to the above, described in the 3GPP (3rd Generation Partnership Project), a method for setting an IPv6 address using an IMEI (International Mobile Equipment Identity) of a mobile communication terminal has been proposed. However, a method for setting an IPv6 address using only an inherent value of a vehicle, has not yet been proposed.

SUMMARY OF THE INVENTION

Accordingly, the present invention has been made to solve the above-mentioned problems occurring in the prior art, and an object of the present invention is to provide a method for setting an IP (Internet Protocol) address of a vehicle using a vehicle identification number when accessing a network of diverse environments.

Another object of the present invention is to provide a method for setting an IP address of a vehicle that is compatible with the existing Extended Unique Identifier (EUI-64) format using a vehicle identification number.

In order to accomplish these objects, there is provided a method for setting an Internet protocol (IP) address for accessing a network, the method including detecting values that indicate inherent vehicle information from a vehicle identification number (VIN), wherein each vehicle includes the VIN; setting a specified bit value for reporting that the IP address is a unique address; and combining the set specified bit value with the values that indicate the inherent vehicle information to create the IP address.

BRIEF DESCRIPTION OF THE DRAWINGS

The above and other objects, features and advantages of the present invention will be more apparent from the following detailed description taken in conjunction with the accompanying drawings, in which:

FIGS. 1A to 1D are diagrams showing a process of setting an IPv6 address;

FIGS. 4A to 4D are diagrams illustrating the process of setting an IP address of FIG. 3.

DETAILED DESCRIPTION OF THE PREFERRED EMBODIMENT

Figure 1A:
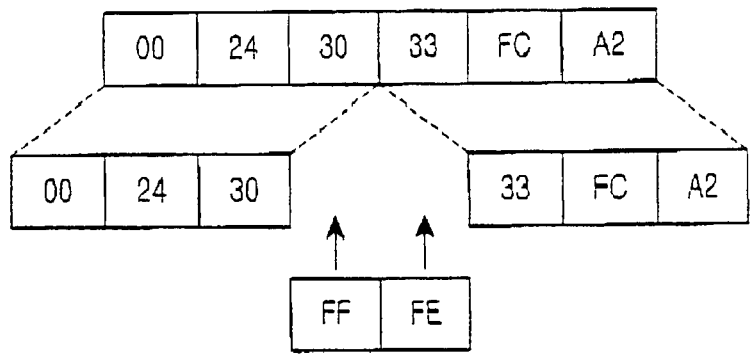
Figure 1B:
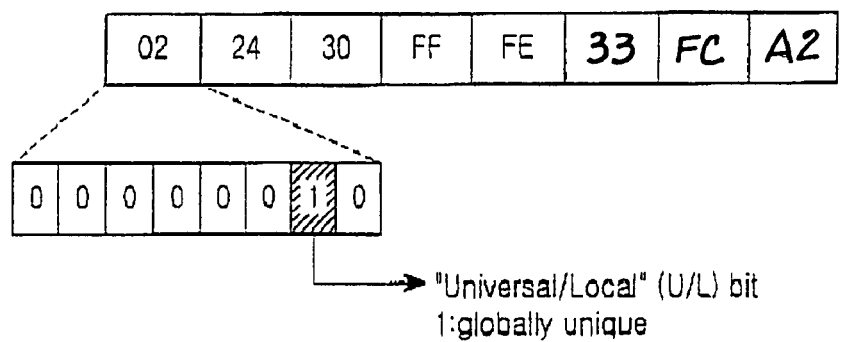

Hereinafter, the method for setting an Internet Protocol (IP) address using a vehicle identification number according to a preferred embodiment of the present invention will be described with reference to the accompanying drawings. In the following description of the present invention, same drawing reference numerals are used for the same elements even in different drawings. Also, a detailed description of known functions and configurations incorporated herein will be omitted when it may make the subject matter of the present invention rather unclear.

Figure 2:
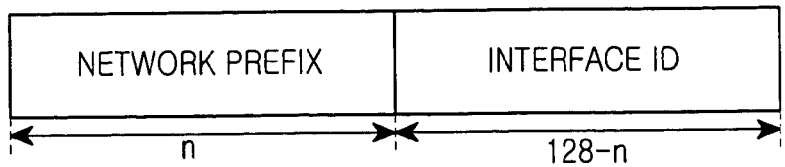
FIG. 2 is a diagram illustrating the structure of an IPv6 address to which the present invention is applied.

FIG. 2 illustrates the structure of an IP version 6 (IPv6) address to which the present invention is applied. Referring to FIG. 2, the IPv6 address of 128 bits comprises a combination of n-bit network prefix and a (128−n)-bit interface ID (Interface Identifier). Also, the IPv6 address of 128 bits is divided into blocks of 16 bits, and each 16-bit block is converted into a hexadecimal number of four significant positions. The network prefix information is allocated according to the Internet communication network management rule, and the interface ID is constructed using identifier information given in a network interface card.

In one embodiment of the present invention, the interface ID is composed of 8 bytes (i.e., 64 bits) in order to set an Internet protocol address that is compatible with the existing Extended Unique Identifier (EUI-64) format.

Figure 3:
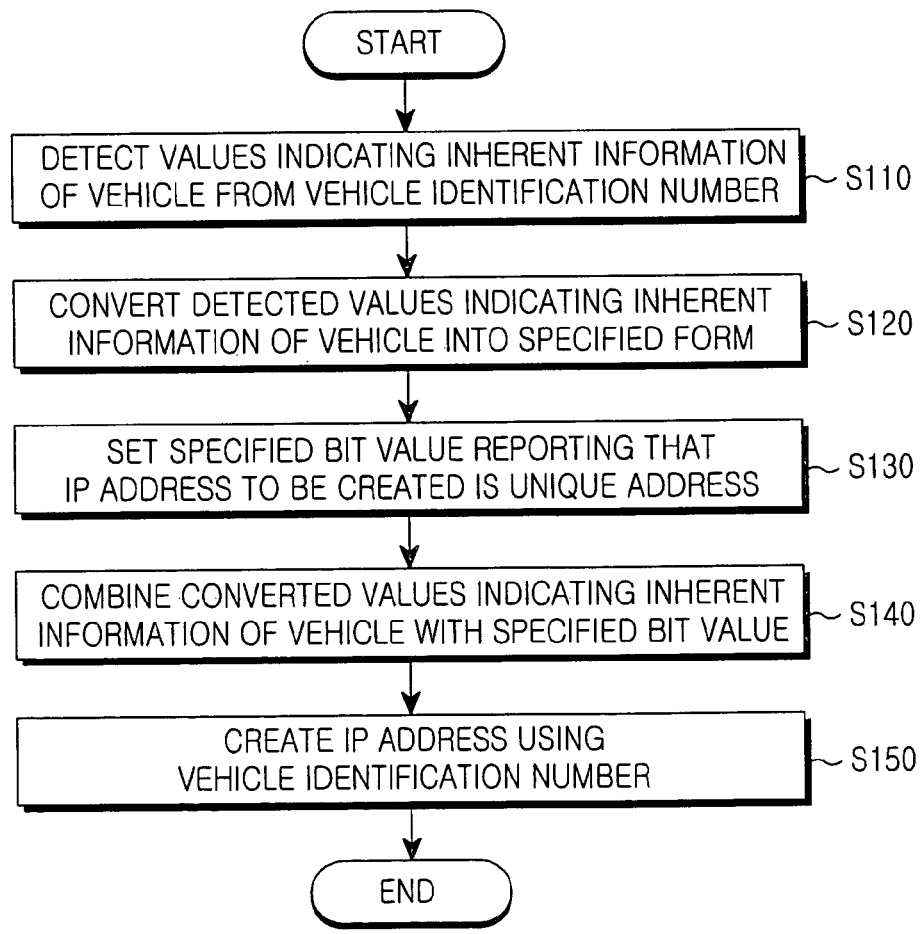
FIG. 3 is a flowchart of a process of setting an IP address using a vehicle identification number according to an embodiment of the present invention.

FIG. 3 is a flowchart illustrating a process of setting an IP address using a vehicle identification number according to an embodiment of the present invention, and FIGS. 4A to 4D are diagrams used for explaining the process of setting an IP address in accordance with the flowchart of FIG. 3.

Here, the vehicle identification number is composed of 17 characters including digits and excluding the letters I, O and Q. The third to ninth character among these 17 characters of the vehicle identification number refer to a code and arrangement set by the manufacturer, but the first, second, tenth and twelfth to seventeenth characters are set according to a common rule. Specifically, the first character of the vehicle identification number indicates the nationality of a manufacturer, the second character, the name of the manufacture, the third character, the vehicle classification, the fourth character, the kind of a vehicle, the fifth character, the shape of a vehicle body, the sixth character, the particulars of the vehicle kind, the seventh character, other characteristics, the eighth character, a motor by engine displacements, the ninth character, the normality/abnormality confirmation of a steering rate, the tenth character, the manufacturing date, the eleventh character, the location of a manufacturing factory, and the twelfth to seventeenth characters, the serial numbers of manufacture, respectively. This vehicle identification number is given using alphabetical characters except for I, O and Q, and Arabic numerals. The lower four characters, among the six characters of the serial numbers of manufacture are given only using the Arabic numerals of 0 to 9.

At step S110, values that indicate inherent information of a vehicle are detected from a vehicle identification number that includes specified information of the vehicle. An IPv6 address set according to the embodiment of the present invention does not refer to all vehicle information of the vehicle identification number, but refers to only the value that indicates the inherent information of the vehicle.

Figure 4A:
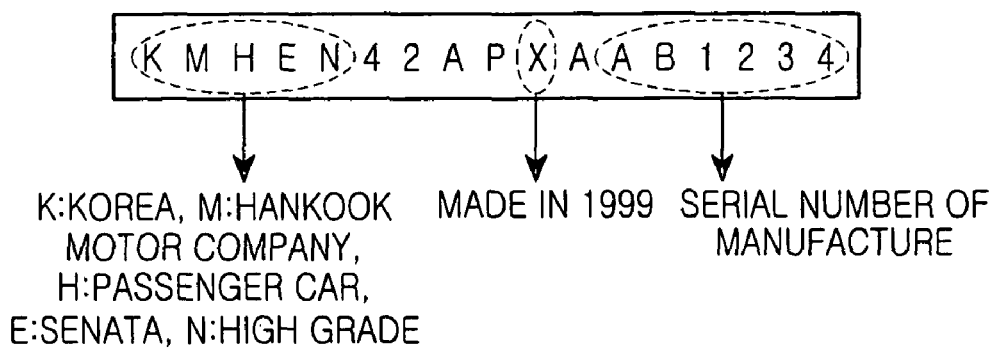

Specifically, it is preferable to detect the values that indicates the nationality of a manufacturer (for example, "K": Korea), the name of a manufacture (for example, "M": Hankook Motor Company), the vehicle classification (for example, "H": passenger car), the kind of a vehicle (for example, "E": Senata), the particulars of the vehicle kind (for example, "N": high grade), the manufacturing date (for example, "X": made in 1995), and the serial number of manufacture (for example, "AB1234") of the vehicle identification number as shown in FIG. 4A as the values that indicate the inherency of the vehicle. The lower four digits, among the six digits of the serial numbers of manufacture are given using the Arabic numerals of 1, 2, 3 and 4, and the remaining values are given using the alphabetical characters.

In step S120, the values that indicate the inherent information of the vehicle detected at step S110 are converted into a specified form, i.e., preset values. Here, the reason why the values that indicate the inherent information are converted into the preset values is to reduce the respective values that indicate the inherent information by more than one bit. In the embodiment of the present invention, the detected values that indicate the inherent information of the vehicle are expressed by six bits.

When the detected values that indicate the inherent information of the vehicle are converted into the preset values, the remaining values (i.e., alphabetical characters or Arabic numerals) are changed. The detected values indicate the inherent information of the vehicle except for the last four digits that are indicated only as the Arabic numerals among the six figures of the serial numbers of manufacture of the vehicle. Here, the method for converting the values, which indicate the inherent information of the vehicle except for the last four digits indicated only as the Arabic numerals is as follows.

In order to reduce the respective values that indicate the inherent information by more than one bit, the alphabetical characters or Arabic numerals, which are values indicating the inherent information of the vehicle, are mapped onto the preset values. Specifically, "A" is mapped onto 0, "B" 1, "C" 2, . . . "Z" 25, "0" 26, "1" 27, "2" 28, . . . . And "9" 35, respectively. Accordingly, the values that are indicated by eight bits can be expressed by six bits (which can express up to 64 at maximum).

For example, the values, which indicate the nationality of a manufacturer (for example, "K": Korea), the name of a manufacture (for example, "M": Hankook Motor Company), the vehicle classification (for example, "H": passenger car), the kind of a vehicle (for example, "E": Senata), the particulars of the vehicle kind (for example, "N": high grade), the manufacturing date (for example, "X": made in 1995), and the serial number of manufacture (for example, "AB1234") of the vehicle, are expressed by six bits as follows.

Since the letter "K" is mapped onto a decimal value 10, it is expressed as a binary value 001010, and since "M" is mapped onto 12, it is expressed as 001100. Since "H" is mapped onto 7, it is expressed as 000111, and since "E" is mapped onto 4, it is expressed as 000100. Since "N" is mapped onto 13, it is expressed as 001101, and since "X" is mapped onto 23, it is expressed as 010111. Since "A" is mapped onto 0, it is expressed as 000000, and since "B" is mapped onto 1, it is expressed as 000001. Also, since the last four figures of the decimal number "1234" can be expressed represented using 14 bits (i.e., 00010011010010), they are not mapped onto the preset values, but expressed as binary data.

Figure 4B:
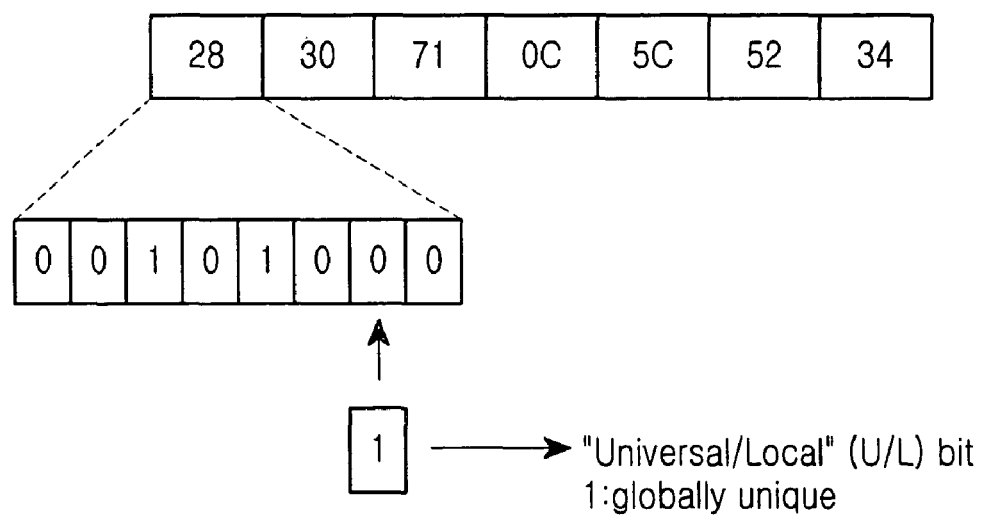

The values of the mapped "K", "M", "H", "E", "N", "X", "A", "B" and "1234" amount to 62 bits in all. However, since the seventh and eighth bits from the most significant bit of the most significant byte for recording the value "K" are the U/L (Universal/Local) bits which should be used to report that the Internet protocol address is a unique address, a hexadecimal value is sequentially recorded in the interface ID except for the seventh and eighth bits. This is expressed as "28:30:71: 0C: 5C:00:52:34" as shown in FIG. 4B.

When step S120 is completed, the specified bit value for reporting that the IP address to be set according to the preferred embodiment of the present invention is the unique address is set in step S130. Specifically, the seventh bit value from the most significant bit of the most significant byte (for recording "28") as shown in FIG. 4B is set to "1". This seventh bit is the U/L bit for reporting that the IP address is globally unique.

When the U/L bit is set, in step S140 it is combined with the values that indicate the inherent information of the vehicle, which has been converted at step S120, to create the interface ID of the IP address. The interface ID created at step S140 is shown in FIG. 4C. Then, in step S150 the IP address using the vehicle identification number is created by combining the created interface ID with the network prefix (See FIG. 4D).

Using the interface ID of 64 bits created through the above-described processes, the IPv6 address having the inherent characteristics of the vehicle, for example, a high-grade Senata car manufactured by Hankook Motor Company of Korea in the year of 1999 and having a serial number of AB1234, can be set.

As described above, according to the present invention, an inherent IP address can be set for each vehicle by setting an interface ID of the IP address using the vehicle identification number. Diverse vehicle information can be obtained through the interface ID of the IP address set using the vehicle identification number. Also, since the IP address according to the present invention is composed of the interface ID of 64 bits, it is compatible with the existing EUI-64 format.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for setting an Internet Protocol (IP) address for a communication module of a vehicle to access a network, the method comprising the steps of:

detecting inherent vehicle information from a vehicle identification number (VIN) from a network interface card, wherein the VIN includes the inherent vehicle information and information related to the vehicle other than the inherent vehicle information, and wherein the inherent vehicle information is set according to a universal manufacturer rule for identification of the vehicle;

converting at least a portion of the detected inherent vehicle information, which is represented by a plurality of alphabetical characters, into preset values, which are represented as Arabic numerals;

expressing the preset values and any unconverted portion of the detected inherent vehicle information as binary data, wherein any unconverted portion of the detected inherent vehicle information is represented as Arabic numerals;

creating an interface identifier (ID) of the IP address by combining a hexadecimal value of the binary data and a specific bit value for reporting that the IP address is a unique address;

creating the IP address by combining the interface ID with a network prefix; and providing the IP address to the network.

2. The method as claimed in claim 1, wherein the inherent vehicle information comprises at least two of a nationality of a manufacturer, a name of a manufacturer, a vehicle classification, a kind of a vehicle, particulars of vehicle kind, a manufacturing date and a serial number of manufacture, which are expressed by alphabetical characters or Arabic numerals.

* * * * *